United States Patent
Yi (10) Patent No.: US 11,825,854 B2
(45) Date of Patent: Nov. 28, 2023

(54) FIXED-QUANTITY MEAT SLICER FOR CHILLED MEAT

(71) Applicant: Geunyoung Yi, Cheonan-si (KR)

(72) Inventor: Geunyoung Yi, Cheonan-si (KR)

( * ) Notice: Subject to any disclaimer, the term of this patent is extended or adjusted under 35 U.S.C. 154(b) by 228 days.

(21) Appl. No.: 17/311,246

(22) PCT Filed: Dec. 12, 2019

(86) PCT No.: PCT/KR2019/017542
§ 371 (c)(1),
(2) Date: Jun. 4, 2021

(87) PCT Pub. No.: WO2020/122616
PCT Pub. Date: Jun. 18, 2020

(65) Prior Publication Data
US 2022/0022472 A1    Jan. 27, 2022

(30) Foreign Application Priority Data

Dec. 13, 2018 (KR) .......................... 10-2018-0160577
Feb. 22, 2019 (KR) .......................... 10-2019-0021371

(51) Int. Cl.
*B26D 5/24* (2006.01)
*A22C 17/00* (2006.01)
*B26D 7/28* (2006.01)

(52) U.S. Cl.
CPC ............ *A22C 17/0033* (2013.01); *B26D 5/24* (2013.01); *B26D 7/28* (2013.01); *B26D 2210/04* (2013.01)

(58) Field of Classification Search
CPC .......... B26D 5/24; B26D 7/28; B26D 7/2628; B26D 1/28; B26D 3/24; B26D 2210/02;
(Continued)

(56) References Cited

U.S. PATENT DOCUMENTS 3,316,104 A * 4/1967 Lugiewicz ............. A23B 4/062
426/284
2015/0190939 A1* 7/2015 Gerlach ............... B26D 7/0683
83/13
(Continued)

FOREIGN PATENT DOCUMENTS

DE    3540904 C2 *  8/1995  ........... A22C 7/0023
FR    2261709 A1 *  2/1974
(Continued)

OTHER PUBLICATIONS

International Search Report of PCT/KR2019/017542, dated Mar. 24, 2020, English translation.

*Primary Examiner* — Nhat Chieu Q Do
(74) *Attorney, Agent, or Firm* — STIP Law Group, LLC (57) ABSTRACT

The present invention is a fixed-quantity meat slicer for chilled meat, comprising a meat loading part having a loading groove on which meat is loaded; a meat pressing part which is disposed on the upper side of the meat loading part, and which presses the meat in a vertical direction during downward movement; a horizontal driving part disposed at one side of the meat loading part so as to press the meat in a horizontal direction; a flange disposed on the other side of the meat loading part so as to form an outlet through which the meat is exposed to the outside according to the forward movement of the horizontal driving part; a restriction cover which is hinge-driven so as to open or close the outlet of the flange, and which prevents the forward movement of the meat when the outlet is closed; a cutter for cutting the meat that moves forward out of the outlet of the flange; and an input part for inputting meat cutting information.

5 Claims, 6 Drawing Sheets

(58) Field of Classification Search
CPC .... B26D 1/43; B26D 7/0608; B26D 2007/13; B26D 2210/04; B30B 15/32
USPC .......................................................... 83/69
See application file for complete search history.

(56) References Cited

U.S. PATENT DOCUMENTS

2016/0332166 A1* 11/2016 Chen ..................... B02C 18/302
2018/0085966 A1* 3/2018 Schmidt ................ B26D 1/143

FOREIGN PATENT DOCUMENTS

| | | | |
|---|---|---|---|
| FR | 2261709 A * | 10/1975 | ........... A22C 7/0023 |
| JP | H07115320 B2 | 12/1995 | |
| JP | 2001315093 A | 11/2001 | |
| JP | 2005193369 A | 7/2005 | |
| KR | 200319421 Y1 | 7/2003 | |
| KR | 20110009997 A | 1/2011 | |

\* cited by examiner

FIXED-QUANTITY MEAT SLICER FOR CHILLED MEAT

CROSS-REFERENCE TO RELATED APPLICATIONS

This application is the U.S. National Phase under 35 U.S.C. § 371 of International Application No. PCT/KR2019/017542 filed on Dec. 12, 2019, which in turn claims the benefit of Korean Application No. 10-2018-0160577 filed on Dec. 13, 2018, and 10-2019-0021371 filed on Feb. 22, 2019, the disclosures of which are incorporated by reference into the present application.

TECHNICAL FIELD

The present disclosure relates to a fixed-quantity meat slicer for chilled meat, and more particularly, to a meat slicer for cutting chilled meat by a fixed quantity.

BACKGROUND ART

Generally, meat such as beef, pork, etc. undergoing through slaughtering and trimming is supplied to a meat processing company or a retail store in the form of a lump, and an operation of uniformly cutting a lump of meat by a constant size or weight may be required according to necessity of cooking. For example, a lump of meat may be cut by a constant thickness or weight to make a pork cutlet. To achieve this, a meat slicer for automatically cutting a lump of meat by predetermined thickness by using a rotating cutter while supplying the lump of meat at a constant speed may be used.

Korean Utility Model Registration Notification No. 20-0319421 discloses a fixed-quantity cutting device of a meat slicer (Patent Document 1) as related-art technology of such a meat slicer.

Figure 1:
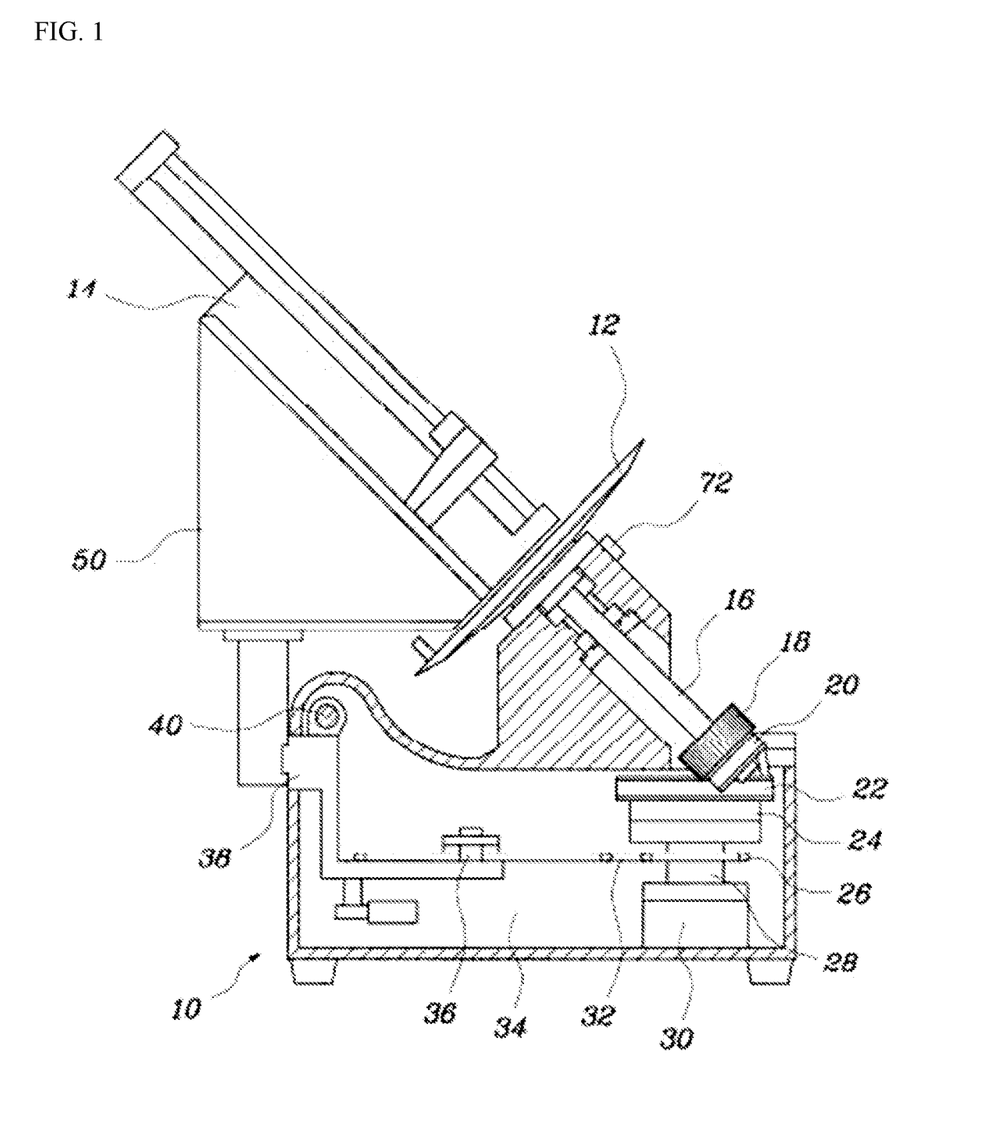
FIG. 1 is a cross-sectional view of a related-art meat slicer.

FIG. 1 is a cross-sectional view of a meat slicer having a measuring board installed therein in the Korean Utility Model Registration Notification No. 0319421 (hereinafter, 'related-art technology').

As shown in FIG. 1, the related-art meat slicer 10 includes a loading box 14 to load meat therein, a loading box driving part 34 including a crank mechanism to move the loading box 14 horizontally, and a rotation cutter 12 to cut a lump of meat by rotating at high speed by a driving motor. The measuring board 50 having a load cell 60 embedded therein to detect a gross weight of a lump of meat loaded in the loading box 14 is installed under the loading box 14, and the slicer includes a converter 62 to convert a weight detection signal outputted from the load cell 60, and a controller 66 to receive the detection signal outputted from the converter 62 and to recognize the gross weight, and to control to cut the lump of meat by a fixed quantity according to a user's command. The user may input a command and a value for cutting to the controller 66 through a key input part 64.

However, the fixed-quantity cutting device of the meat slicer according to the related-art technology is used for frozen meat, and frozen meat is easy to cut since the meat is frozen and thus maintains its shape, but in the case of chilled meat, a shape is not maintained and the meat has the property of returning to its original state, and accordingly, it is difficult to cut chilled meat, and, even if the meat is cut, there is a problem that it is difficult to uniformly adjust a cutting weight. That is, the related-art meat slicer has the advantage of uniformly cutting frozen meat by a constant weight, but has the disadvantage in using for chilled meat which is difficult to smoothly cut since the shape of meat is not well maintained when the meat is cut, and does not have uniform shape and size.

As described above, it is very difficult to divide chilled meat by a standardized constant weight in the related-art method, and thus manually cutting is preferred over cutting by a machine, but it is virtually impossible for a person to exactly divide and cut, and the reality is that extras of 7-15% are added according to persons' skills.

An automatic meat slicer applying IT-based contactless 3D scanning technology has been developed and distributed in Germany, but its price reaches hundreds of millions of won, and results therefrom do not show satisfactory precision, and thus, there is a limit to distributing as normal products.

PRIOR ART DOCUMENT

Patent Document (Patent Document 1) Korean Utility Model Registration Notification No. 20-0319421 (registered on Jun. 28, 2003)

DETAILED DESCRIPTION OF THE PRESENT DISCLOSURE

Technical Objects

The present disclosure has been developed in order to solve the above-mentioned problems, and an object of the present disclosure is to provide a new fixed-quantity meat slicer for chilled meat, which can repeatably cut chilled meat by a fixed quantity at a low cost.

Technical Solving Method

The present disclosure relates to a fixed-quantity meat slicer for chilled meat, including: a meat loading part having a loading groove in which meat is loaded; a meat pressing part which is disposed on an upper side of the meat loading part, and is configured to press the meat placed in the loading groove in a vertical direction during downward movement; a horizontal driving part disposed at one side of the meat loading part to press the meat in a horizontal direction and to press the meat placed in the loading groove into a constant volume, and to move forward the meat by a predetermined cutting size; a flange disposed at the other side of the meat loading part to form an outlet through which the meat is exposed to the outside according to forward movement of the horizontal driving part; a restriction cover which is hinge-driven to open or close the outlet of the flange, and is configured to prevent forward movement of the meat to press the meat placed in the loading groove into a constant volume when the outlet is closed; a cutter configured to cut the meat which moves forward out of the outlet of the flange, by a predetermined length; and an input part through which cutting information of the meat is inputted.

In addition, the outlet formed on the flange may include a discharge member which is formed smaller than a cross-sectional area which is formed in combination with a cross section of the loading groove when the meat pressing part moves down.

Herein, the input part may receive an input of a number of lumps of meat to be cut and a cutting weight value regarding the meat.

Herein, the restriction cover may open after the meat is pressed into a constant volume by the meat pressing part and the horizontal driving part.

In addition, the horizontal driving part may press the meat up to a pre-set pressure or torque in the horizontal direction.

In addition, a series of processes of moving forward, by the horizontal driving part, the pressed meat protruding out of the flange by a predetermined length, and of cutting, by the cutter, the moved meat by the predetermined length, may be repeated.

In addition, when a number of lumps of meat to be cut, which is inputted through the input part, is larger than a number of lumps of meat cut by the cutter, the meat pressing part and the horizontal driving part may return to the standby state of their original positions to allow meat to be additionally inputted to the meat loading part.

Advantageous Effect

Base technologies used for the fixed-quantity meat slicer for the chilled meat according to the present disclosure are technologies for putting chilled meat into a frame of a constant shape and pressing the meat, and there is no problem since well-known hydraulic technology is used. In addition, location control technology of a servo motor for precisely cutting by a fixed quantity is also well known, and accordingly, technology for using at a low cost is already provided. Accordingly, there is an advantage that cutting chilled meat by a fixed quantity can be implemented at a low cost.

In addition, according to the present disclosure, in a state in which chilled meat is pressed into a predetermined shape, a density of meat is calculated with reference to an already measured weight of meat and a pressed volume, and a lump of meat is cut by a cutting length corresponding to a cutting weight value, which is set through the input part with reference to the density of the pressed meat, so that cutting by a fixed quantity can be repeatedly implemented at high speed without an error, and accordingly, productivity can be enhanced more than in manual operations and standardization by precise weight is possible, and thus, a big ripple effect on the whole food industry can be expected.

Furthermore, the discharge member which is formed smaller than a cross-sectional area which is combined with the cross section of the loading groove when the meat pressing part moves down is provided on the outlet of the flange, so that meat is pressed and is discharged with a constant density through the outlet of the flange, and accordingly, there is an advantage that the meat can be cut more precisely and exactly.

That is, even when the shape of meat inputted to the meat loading part is not uniform or there is an empty space in the meat pressed by the meat pressing part, the meat can be always discharged in a constant shape through the discharge member, and pressure in the loading groove is constant, and thus, there is an advantage that meat can be cut by a fixed quantity more precisely.

In addition, the shape arrangement member of the outlet is formed to have a circumference gradually decreasing, so that meat can be discharged through the outlet without being damaged.

BRIEF DESCRIPTION OF THE DRAWINGS

FIG. 4($a$), FIG. 4($b$) and FIG. 4($c$) are a view illustrating a series of processes of cutting a lump of meat moved forward out of a flange by a cutting thickness by using a rotating cutter;

FIG. 6($a$) is a left side view of the outlet of the fixed-quantity meat slicer for chilled meat according to the present disclosure; and FIG. 6($b$) is a front view illustrating a state in which a meat loading part and the outlet of the fixed-quantity meat slicer for chilled meat contact each other according to the present disclosure.

BEST MODE FOR EMBODYING THE INVENTION

Hereinafter, embodiments of the present disclosure will be described in detail with reference to exemplary drawings. In giving reference numerals to elements of each drawing, the same reference numerals are used for the same elements even when they are depicted in different drawings. In addition, in the description of embodiments of the present disclosure, certain detailed explanations of related-art well-known constitutions or functions are omitted when it is deemed that they may unnecessarily obscure the understanding of the embodiments of the present disclosure.

In addition, in explaining elements of the embodiments of the present disclosure, the terms 'first', 'second', 'A', 'B', '(a)', '(b)' may be used. These terms are just for distinguishing one element from another element, and the essence, order, or sequence of a corresponding element are not limited by these terms. It should be understood that, when a certain element is referred to as "being connected to", "coupled to", or "accessing" another element, the element may be directly connected to or access another element, or may indirectly be "connected to", "coupled to", or "access" another element via still another element interposed therebetween.

A fixed-quantity meat slicer for chilled meat of the present disclosure has been completed by solving a problem that it is difficult to cut by a fixed quantity due to unique elasticity of chilled meat that unfrozen tissue has through a switch of ideas.

Fixed-quantity cutting of chilled meat in the present disclosure starts from a simple principle that a weight of an object having a known density is proportional to a volume, and is based on the property of chilled meat that the chilled meat can be pressed smaller than its original volume due to its unique elasticity, and, when the meat is released from the pressed state, the meat gradually returns to its original shape with time.

When chilled meat having a changeable shape is pressed into a pillar shape having a constant cross-sectional area and then is cut by a constant thickness on the premise that the specific gravity is constant, a desired cutting weight is proportional to a cutting thickness, and accordingly, it is possible to automatically cut chilled meat by a fixed quantity.

In addition, even when chilled meat is pressed to be cut by a fixed quantity, the cut meat may return to its original shape due to its own elasticity, and there is no problem in forming in a desired shape in a process of handling for cooking.

In summary, the fixed-quantity meat slicer for the chilled meat of the present disclosure is established based on the following preconditions:

1. Characteristics of chilled meat
   Chilled meat has characteristics of having constant shape, size, specific gravity according to cuts of meat.
   Chilled meat is frequently deformed and is easy to deform by an external force since it is a very soft solid.
   A change in volume caused by pressure is almost constant.
   Deformation within a specific range is recoverable.
2. Quality Maintenance
   Natural quality of chilled meat can be maintained only if the chilled meat is deformed into a constant pillar shape within the range of its own shape and restoring force.
3. Specific gravity is constant.
   It may be assumed that the same cut has the same specific gravity since cuts have similar tissue ingredients.
4. Weight is directly proportional to a volume.

weight=specific gravity×volume

Limitations in development
Since a range of kinds of meat that can be cut by a machine capable of cutting all kinds of meat by a fixed quantity is very ambiguous, there is no machine satisfying this. Therefore, it may be appropriate to distribute the fixed-quantity meat slicer for chilled meat of the present invention by setting limits to cuts of chilled meat and reducing a price, and increasing productivity and a degree of precision.

Hereinafter, a configuration of a fixed-quantity meat slicer 100 for chilled meat of the present invention, which has been completed based on the above-described principles, will be described in detail with reference to the accompanying drawings.

Figure 2:
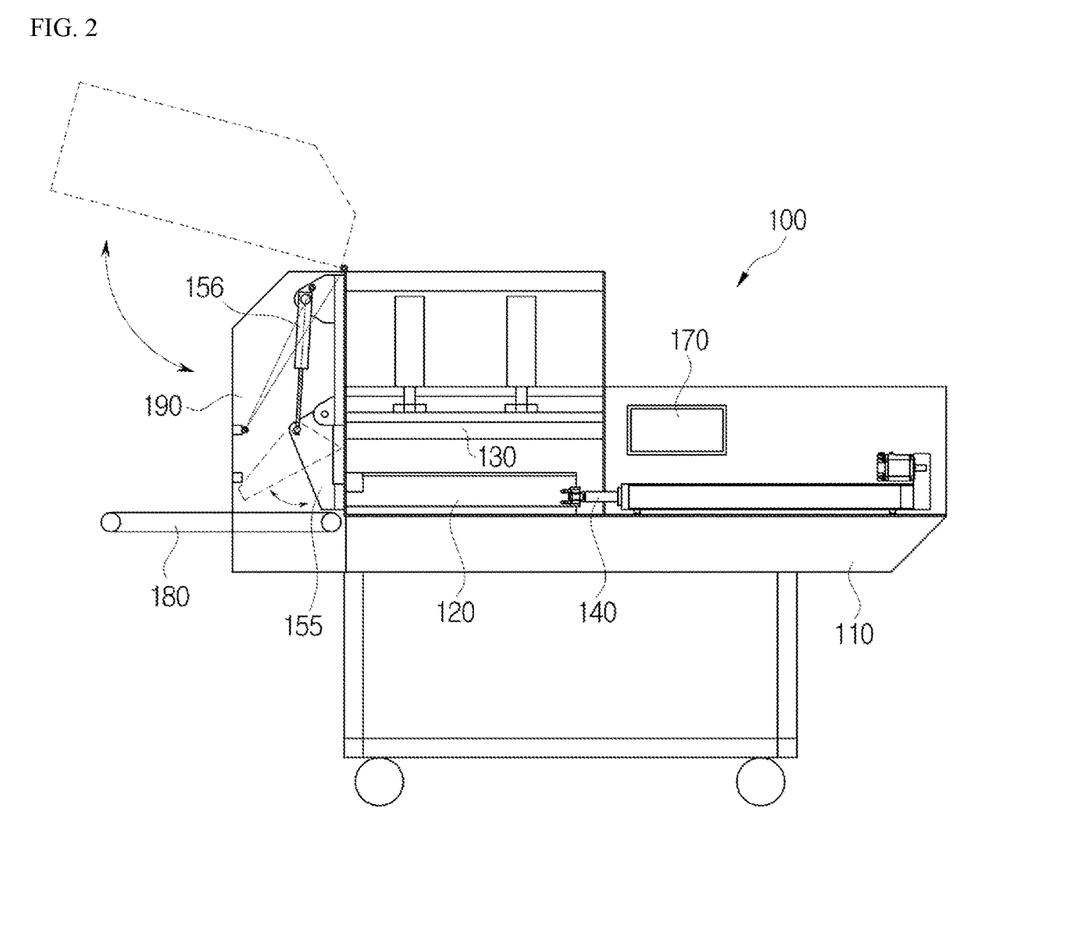
FIG. 2 is a front view of a fixed-quantity meat slicer for chilled meat according to the present disclosure.
Figure 3:
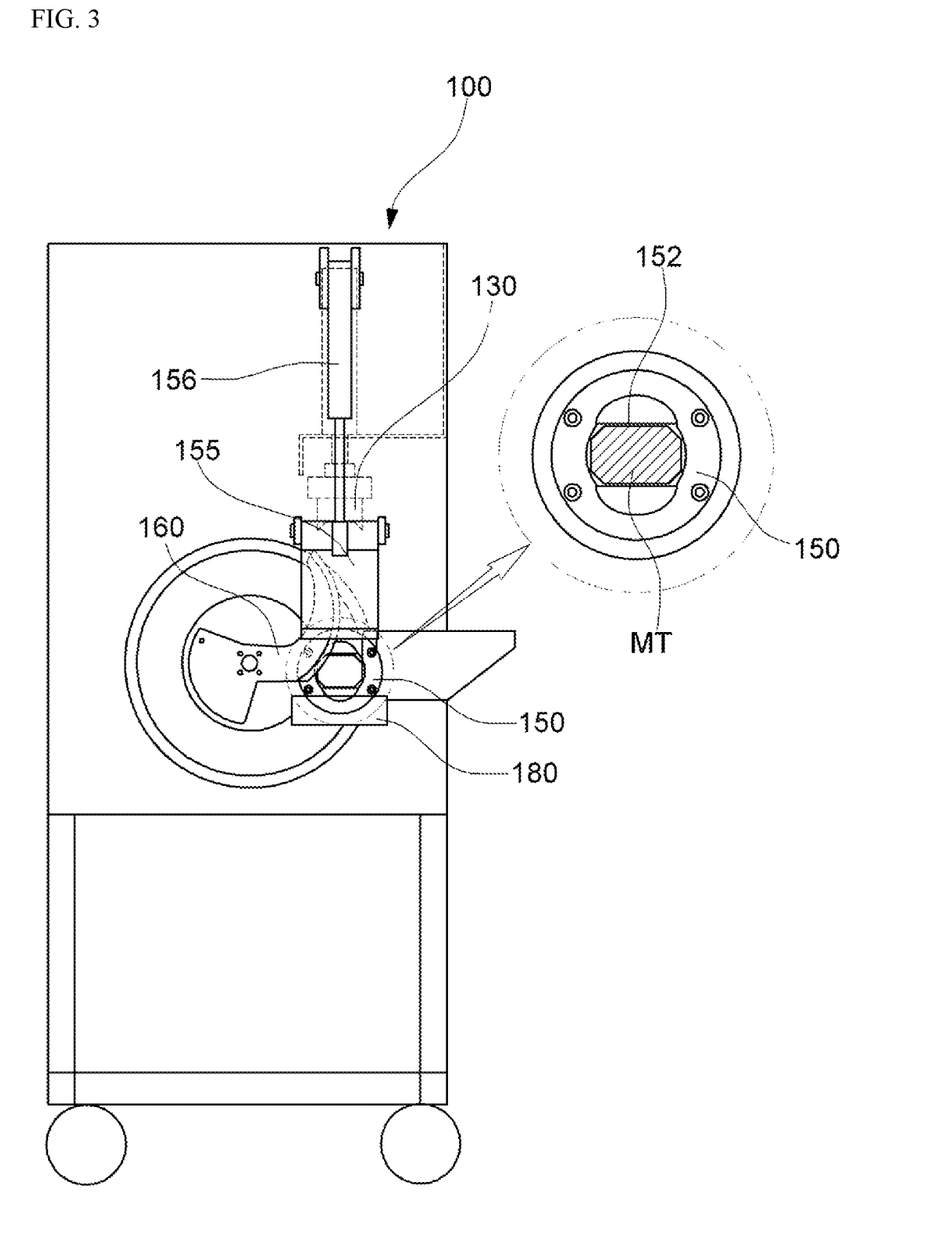
FIG. 3 is a left side view of the fixed-quantity meat slicer for chilled meat according to the present disclosure.

FIG. 2 is a front view of the fixed-quantity meat slicer 100 for the chilled meat according to the present disclosure, and FIG. 3 is a left side view of the fixed-quantity meat slicer 100 for the chilled meat according to the present disclosure.

The fixed-quantity meat slicer 100 for the chilled meat in embodiment 1 of the present disclosure has a meat loading part 120, a meat pressing part 130, a horizontal driving part 140, a flange 150, a restriction cover 155, a cutter 160, and an input part 170 which are installed on a main body 110. In the following description of the present disclosure, a configuration of a controller is omitted. This is just because the feature that driving of the meat pressing part 130, the horizontal driving part 140, the restriction cover 155, and the cutter 160, and processing of setting data inputted through the input part 170 are automatically controlled by a programmed micro-processor belongs to the range of well-known or ordinary technology, and thus there is no problem in understanding the present disclosure even if the controller is omitted, and this is not because the configuration of the controller is not required for the present disclosure.

The meat loading part 120 is a part on which chilled meat to be cut by a fixed quantity is loaded. The meat loading part 120 is provided with a loading groove 122 in which meat is placed, and a size of meat to be inputted is appropriately handled according to a size of the loading groove 122 and is prepared. A cross-sectional shape of the loading groove 122 may be a semi-circular shape or a polygonal shape close to a semicircle so as to allow the meat to be pressed tightly.

The meat pressing part 130 is a part which is disposed on an upper side of the meat loading part 120 to press meat placed in the loading groove 122 of the meat loading part 120 in a vertical direction during downward movement. The meat pressing part 130 may be operated in the vertical direction by a hydraulic mechanism (hydraulic cylinder), and is combined with the cross section of the loading groove 122 to form a closed cross section of an oval shape or a polygonal shape close to the oval. That is, a lump of meat pressed by downward movement of the meat pressing part 130 with respect to the meat loading part 120 forms the same cross-sectional shape as the oval or polygon close to the oval.

The lump of meat pressed by the meat pressing part 130 stretches in a horizontal direction while being pressed in the vertical direction. In this case, a density of the meat is not constant in the horizontal direction due to the ununiform shape of chilled meat and an empty space resulting therefrom.

The horizontal driving part 140 is an element that is disposed at one side of the meat loading part 120 to press the meat pressed in the vertical direction in the horizontal direction, and an empty space of the pressed lump of meat surrounded by the meat loading part 120 and the meat pressing part 130, and the horizontal driving part 140 is removed by pressing in the horizontal direction by the horizontal driving part 140, so that the density becomes quite uniform.

The vertical cross sectional area of the meat which is made to be uniform by pressing by the meat loading part 120 and the meat pressing part 130 is pre-set, and furthermore, a sensor (potentiometer, etc.) may detect how much the horizontal driving part 140 moves forward in the horizontal direction. Accordingly, a volume of the pressed lump of meat surrounded by the meat loading part 120 and the meat pressing part 130, and the horizontal driving part 140 may be calculated, and the weight of the lump of meat is an inputted value (or a value pre-set according to specific gravity), and therefore, the specific gravity of the pressed lump of meat can be known. Since the weight of meat can be grasped according to the volume of the meat, a cutting weight which is proportional to a cutting thickness can be quite exactly adjusted.

The horizontal driving part 140 performs the primary role of pressing the lump of meat in the horizontal direction, and also performs the role of moving the meat toward the cutter 160 as long as a predetermined cutting size after the meat is pressed.

Herein, it is preferable to use a device capable of moving forward very precisely as long as desired as the horizontal driving part 140, and for example, a servo motor of a Cartesian coordinate robot may be used. On the other hand, it is preferable to use a hydraulic cylinder as the meat pressing part 130 since a pressing force should be great.

The flange 150 is disposed at the opposite side of the horizontal driving part 140, that is, at the other side of the meat loading part 120, and has an outlet 152 formed thereon to allow the meat to be exposed or protrude to the outside according to the forward movement of the horizontal driving part 140.

In addition, the restriction cover 155 is provided on an outside of the outlet area of the flange 150 to prevent the meat from moving toward the outlet 152 of the flange 150 and from being pushed out when the meat placed in the loading groove 122 is pressed in the horizontal direction to have a constant volume.

The restriction cover 155 is hinge-driven to open or close the outlet of the flange 150. That is, as shown in FIG. 2, the restriction cover 155 is installed to be hinge-driven with respect to the main body 110 above the flange 150, and a rod of a hydraulic cylinder 156 is coupled to the restriction cover 155 installed in this way. Accordingly, the restriction cover 155 is hinge-driven by a stretching operation of the hydraulic cylinder 156 to open or close the outlet of the flange 150.

As described above, in the state in which the hydraulic cylinder 156 is stretched and the restriction cover 155 closes the outlet of the flange 150, the horizontal driving part 140 moves forward in the horizontal direction and presses the meat MT, and, after pressing of the meat MT is finished, the hydraulic cylinder 156 is retracted and opens the outlet of the flange 150, such that the meat MT protrudes out of the outlet of the flange 150 according to forward movement of the horizontal driving part 140 in the horizontal direction.

It may be preferable to restrict a degree of pressing the meat in the horizontal direction by the horizontal driving part 140 to an appropriate level. This is because, if the meat, in particular, chilled meat, is excessively pressed, juices containing many taste components may come out, and quality of meat is harmfully influenced. Therefore, there is a need to monitor a pressing level of the horizontal driving part 140 and to restrict a limit value thereof. For example, an appropriate limit value regarding pressing in the horizontal direction may be restricted by measuring a torque (which is proportional to an amount of electric current) applied to a driving motor for driving the horizontal driving part 140, or by directly measuring pressure applied to the meat by the horizontal driving part 140. When the present disclosure is really used, a degree of pressing in the horizontal direction may be initially set for each of cuts of meat having different tissue elasticities, and the same limit value may be iteratively applied to the same cut of meat.

Figure 4:
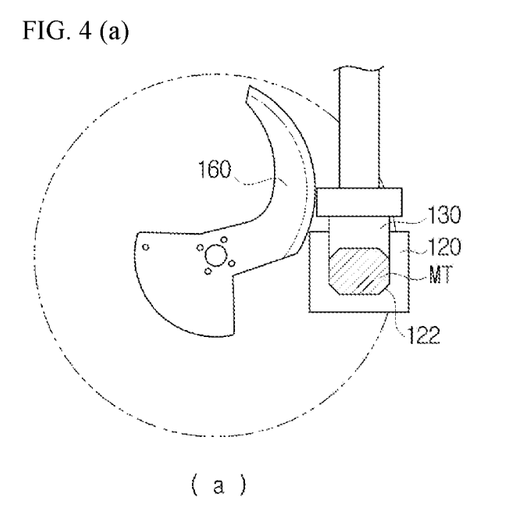
Figure 4B:
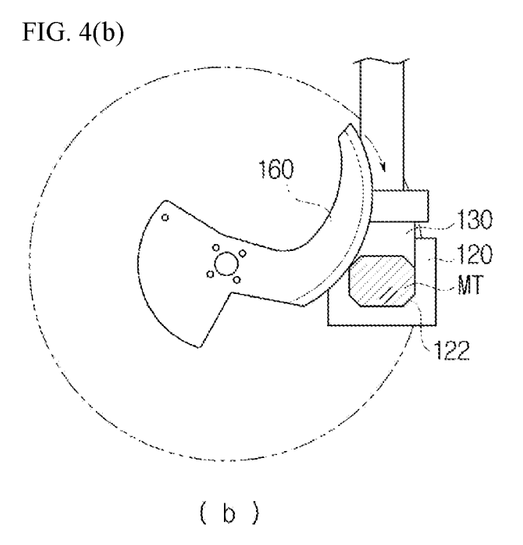
Figure 4C:
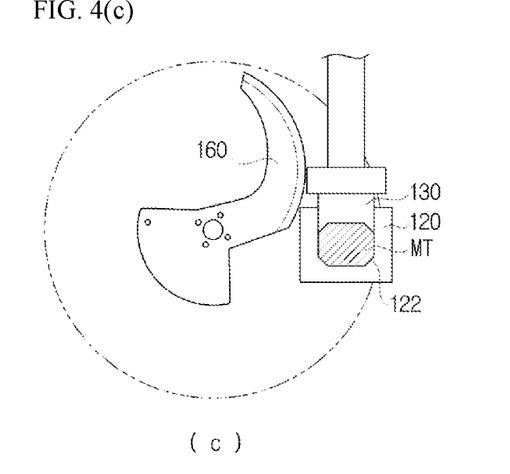

As shown in FIG. 4(a), FIG. 4(b) and FIG. 4(c) the rotating cutter 160 cuts the meat moved out of the outlet 152 of the flange 150 by a predetermined length. The horizontal driving part 140 moves forward the pressed meat, which protrudes out of the outlet 152 of the flange 150, by a predetermined length corresponding to a cutting weight, and, when the meat moves forward by the predetermined length, the cutter 160 repeats a series of processes of rotating and cutting by a fixed quantity.

As shown in the series of cutting processes shown in FIG. 4(a), FIG. 4(b) and FIG. 4(c) when the cutter 160 is determined to rotate in the clockwise direction, the cutter 16 temporarily stops above the outlet 152 of the flange 150 and is in a standby state (FIG. 4(a)). While the cutter 160 is in the standby state, the horizontal driving part 140 moves forward in the horizontal direction by a predetermined distance and makes the meat MT protrude out of the outlet 152 of the flange 150 by a length proportional to a cutting weight, and then stops (FIG. 4(b)), and thereafter, the cutter 160 rotates and cut, the meat MT, and returns to its original position (view FIG. 4(c)).

The series of processes shown in FIG. 4(a), FIG. 4(b) and FIG. 4(c) is one fixed-quantity cutting process, and a large amount of meat is cut by a fixed quantity by repeating the series of processes. As described above, the fixed quantity meat slicer 100 for the chilled meat of the present disclosure automatically implements a meat slicing process, and particularly, can exactly perform a process of cutting chilled meat which does not have a fixed form and has elasticity, by a fixed quantity.

In addition, the input part 170, for example, the input part 170 including a touch screen, is used as a means for inputting cutting information of meat. For example, a cutting weight value of chilled meat to be inputted to the meat loading part 120 may be inputted, and, if necessary, a number of lumps of meat to be cut may be additionally inputted.

When the number of lumps of meat to be cut is inputted to the input part 170 and the number of lumps of meat to be cut, which is inputted to the input part 170, is larger than the number of lumps of meat cut by the cutter 160, the meat pressing part 130 and the horizontal driving part 140 return to the standby state of the original position so as to additionally input meat to the meat loading part 120, and continue performing the operation with respect to the same meat cut, and accordingly, an additional operation may be performed efficiently by applying information of the previous operation regarding the degree of pressing by the horizontal driving part 140 in the horizontal direction as it is.

Figure 5:
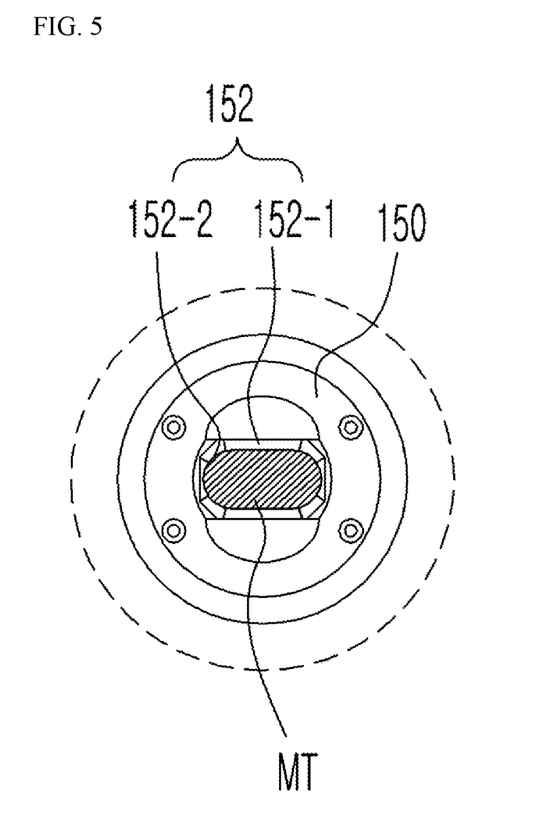
FIG. 5 is a left side view of another embodiment of an outlet of the flange of the fixed-quantity meat slicer for chilled meat according to the present disclosure.
Figure 6:
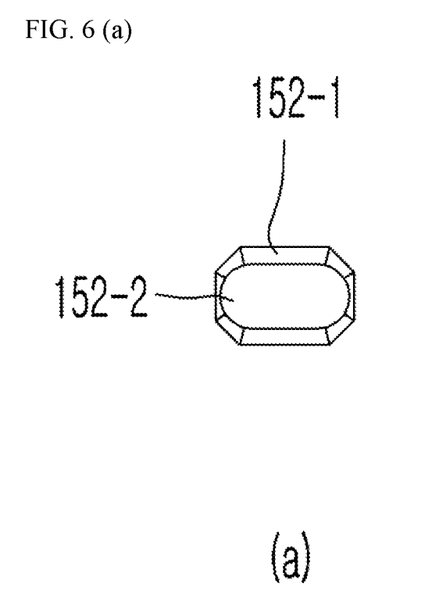

Referring to FIGS. 5 and 6, the second embodiment of the fixed-quantity meat slicer for the chilled meat of the present disclosure is the same as the first embodiment described above in all components.

However, the outlet 152 formed on the flange 150 may be formed smaller than a cross-sectional area formed by the loading groove 122, in which meat is placed, and the downward movement of the meat pressing part 130, so as to press the meat tightly and discharge the same.

Specifically, the outlet 152 includes a shape arrangement member 152-1 and a discharge member 152-2.

First, the shape arrangement member 152-1 has one side formed to have the same cross-sectional area as the oval cross-section area or polygonal cross-sectional area close the oval, which is formed in combination with the cross section of the loading groove 122 when the meat pressing part 130 moves down, and to be in contact with the meat loading part, and is configured to have a circumference gradually decreasing toward the other side.

In addition, the discharge member 152-2 is extended from the other side of the shape arrangement member 152-1 to have a predetermined width, and is formed to have a cross sectional area smaller than the cross-sectional area formed in combination with the cross section of the loading groove 122 when the meat pressing part 130 moves down, and has an end contacting the cutter 160 when meat is cut.

In addition, the discharge member 152-2 is formed to have an area smaller than the closed oval cross sectional area or polygonal cross sectional area close to the oval, which is formed in combination with the cross section of the loading groove 122 when the meat pressing part 130 moves down. In this case, it is preferable that the discharge member 152-2 is formed to have 55%-65% of the closed cross-sectional area formed in combination with the cross section of the loading groove 122 when the meat pressing part 130 moves down, but this should not be considered as limiting.

As described above, the discharge member 152-2 of the outlet 152 through which meat is finally discharged is formed smaller than the closed cross-sectional area formed in combination with the cross section of the loading groove 122 when the meat pressing part 130 moves down, such that, even when the shape of meat inputted to the meat loading part 120 is not constant or there is an empty space in the meat pressed by the meat pressing part 130, the meat can be pressed and discharged by the discharge member 152-2 and can be always discharged with a constant shape.

In addition, pressure in the loading groove 122 is made to be constant and more precise fixed-quantity cutting is possible.

Furthermore, the shape arrangement member 152-1 is formed to have a circumference gradually decreasing, such that meat can be discharged through the discharge member 152-2 without being damaged.

Accordingly, the meat can be cut by a fixed quantity within an error range while moving forward by a predetermined length.

The series of operating processes of the fixed-quantity meat slicer 100 for the chilled meat of embodiment 1 and embodiment 2 according to the present disclosure is summarized as follows.

First, an operator prepares a lump of chilled meat. The operator inputs a cutting weight value through the input part 170, and, if necessary, additionally inputs a number of lumps of meat to be cut.

Next, the operator inputs meat into the loading groove 122 of the meat loading part 120, and a subsequent process proceeds manually or automatically.

The restriction cover 155 closes the outlet 152 of the flange 150, and in this state, the meat pressing part 130 moves down with respect to the meat loading part 120 and presses the lump of meat placed in the loading groove 122 in the vertical direction. Next, the horizontal driving part 140 is driven and presses the lump of meat to appropriate pressure in the horizontal direction. The lump of meat pressed in all directions has a substantially uniform density.

Since the density of the pressed lump of meat is constant, a cutting thickness corresponding to the cutting weight value is calculated accordingly. Since a cross-sectional area of the meat pressed by the meat pressing part 130 and the horizontal driving part 140 is constant, the cutting weight value is proportional to the cutting thickness.

When the cutting thickness is calculated, the restriction cover 155 switches to a state for opening the outlet 152 of the flange 150, and thereafter, the horizontal driving part 140 moves forward by a distance corresponding to the cutting thickness, and pushes the lump of meat out of the outlet 152 of the flange 150.

When the meat protrudes out of the outlet 152 of the flange 150, the cutter 160 in a standby state rotates and cuts the lump of meat protruding out of the flange 150. As described above, the forward movement of the horizontal driving part 140 and the rotation of the cutter 160 are performed alternately, and the lump of meat is continuously cut by a fixed quantity by repeating the forward movement and the rotation.

The cut meat may be conveyed by a conveyer 180 which is positioned under the cutter 160 and the flange 150, and the forward movement of the horizontal driving part 140 and the cutting process of the cutter 160 are repeated until a desired number of lumps of meat is cut. When the number of lumps of meat to be cut is inputted through the input part 170 and the number of lumps of meat to be cut, which is inputted through the input part 170, is larger than the number of lumps of meat cut by the cutter 160, the meat pressing part 130 and the horizontal driving part 140 return to the standby state of the original positions so as to additionally input meat to the meat loading part 120.

In addition, when the operation is continuously performed with respect to the same meat cut, an additional operation may be performed by applying information of the previous operation regarding the degree of pressing by the horizontal driving part 140 in the horizontal direction, etc. as it is.

In embodiment 2, the meat positioned in the meat loading part 120 is moved forward by the horizontal driving part 140 by a predetermined length, and is discharged through the outlet 152, which includes the shape arrangement element 152-1 which has a circumference gradually decreasing, and the discharge member 152-2 which is formed smaller than the closed cross-sectional area formed in combination with the cross section of the loading groove 122 when the meat pressing part 130 moves down.

The above descriptions are merely to explain the technical concept of the present disclosure by way of an example, and it is obvious to those skilled in the art that various modifications and changes can be made without departing from the essential characteristics of the present disclosure. Accordingly, embodiments disclosed in the present disclosure are not intended to limit the technical concept of the present disclosure, but intended to explain, and the range of the technical concept of the present disclosure is not limited by the embodiments disclosed herein. The protection scope of the present disclosure should be interpreted based on the claims described below, and all technical concepts within the range equivalent thereto should be interpreted as being included in the right scope of the present disclosure.

| Explanation of Signs | | | |
|---|---|---|---|
| 100: | fixed-quantity meat slicer for chilled meat | 110: | main body |
| 120: | meat loading part | 122: | loading groove |
| 130: | meat pressing part | 140: | horizontal driving part |
| 150: | flange | 152: | outlet |
| 152-1: | shape arrangement member | 152-2: | discharge member |
| 155: | restriction cover | 160: | cutter |
| 170: | input part | 180: | conveyer |
| 190: | safety cover | MT: | meat |

What is claimed is:

1. A fixed-quantity meat slicer for chilled meat, comprising:
    a meat loading part comprising a loading groove in which meat is loaded;
    a meat pressing part disposed above the meat loading part and configured to press the meat in a vertical direction when the meat pressing part is moved downward after the meat is placed in the loading groove;
    a flange disposed at one end of the meat loading part and comprising an outlet configured to expose the meat to the outside of the meat loading part,
    a horizontal driving part disposed at the other end of the meat loading part and configured to press the meat in a horizontal direction when the outlet is closed, wherein a preset constant volume of the pressed meat is formed by pressing the meat vertically and horizontally in a state which the outlet is closed, and the horizontal driving part is configured to move the preset constant volume of the- pressed meat out of the outlet in a state which the outlet is open;
    a restriction cover hinge-driven by a driven means and configured to open or close the outlet of the flange;
    a cutter configured to rotate and cut the pressed meat vertically by a predetermined length when the pressed meat is moved forward out of the outlet by the horizontal driving part in the state in which the outlet is open; and
    an input part where cutting information of the meat is input,
    wherein,
    the restriction cover is configured to open the outlet after the pressed meat is formed by pressing the meat vertically and horizontally, the cross-section of the outlet of the flange is smaller than the cross-section of the meat before compression, the horizontal driving part is configured to move the pressed meat horizontally out of the outlet after the outlet is open.

2. The fixed quantity meat slicer for the chilled meat of claim 1, wherein the input part is configured to receive an input of a number of lumps of meat to be cut and a cutting weight value regarding the meat.

3. The fixed quantity meat slicer for the chilled meat of claim 1, wherein the horizontal driving part is configured to press the meat up to a pre-set pressure or torque in the horizontal direction when the outlet is closed.

4. The fixed quantity meat slicer for the chilled meat of claim 1, wherein a series of processes of moving forward, by the horizontal driving part, the pressed meat protruding out of the flange by a predetermined length, and of cutting, by the cutter, the moved meat by the predetermined length, is repeated.

5. The fixed quantity meat slicer for the chilled meat of claim 1, wherein, when a number of lumps of meat to be cut, which is inputted through the input part, is larger than a number of lumps of meat cut by the cutter, the meat pressing part and the horizontal driving part return to the standby state of their original positions to allow meat to be additionally inputted to the meat loading part.

* * * * *